R. LEDUC.
CARBURETER.
APPLICATION FILED AUG. 5, 1913.
1,119,181.
Patented Dec. 1, 1914.
3 SHEETS—SHEET 1.
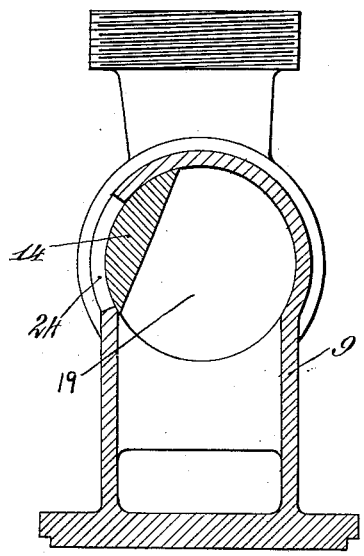
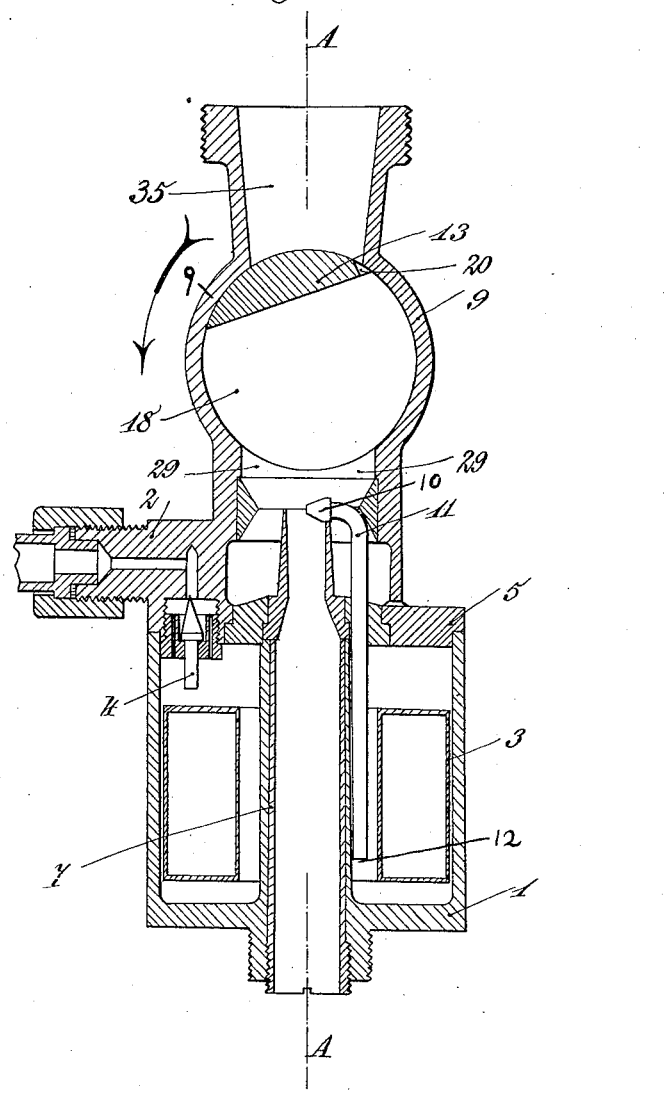
WITNESSES
INVENTOR
RAOUL LEDUC

R. LEDUC.
CARBURETER.
APPLICATION FILED AUG. 5, 1913.

1,119,181.

Patented Dec. 1, 1914.
3 SHEETS—SHEET 2.

WITTNESSES

M. M. Border.
U S J Dunbar

INVENTOR
RAOUL LEDUC

BY Percy H Moore
ATTY.

INVENTOR
RAOUL LEDUC

UNITED STATES PATENT OFFICE.

RAOUL LEDUC, OF ROUEN, FRANCE.

CARBURETER.

1,119,181. Specification of Letters Patent. Patented Dec. 1, 1914.

Application filed August 5, 1913. Serial No. 783,226.

*To all whom it may concern:*

Be it known that I, RAOUL LEDUC, a citizen of the Republic of France, and residing at Rouen, France, have invented new and useful Improvements in or Relating to Carbureters for Explosion-Engines, of which the following is a specification.

The invention has for its subject matter an improved carbureter for explosion engines.

According to the present invention, a regulating mechanism represented by a rotary valve formed of two hollow cylinders placed end to end, one of them controlling the passage of the explosive mixture and the other two supply inlets for additional air in proportion to the speed, is arranged above the carbureting chamber.

On the accompanying drawings a carbureter is represented in accordance with the invention.

Figure 2:
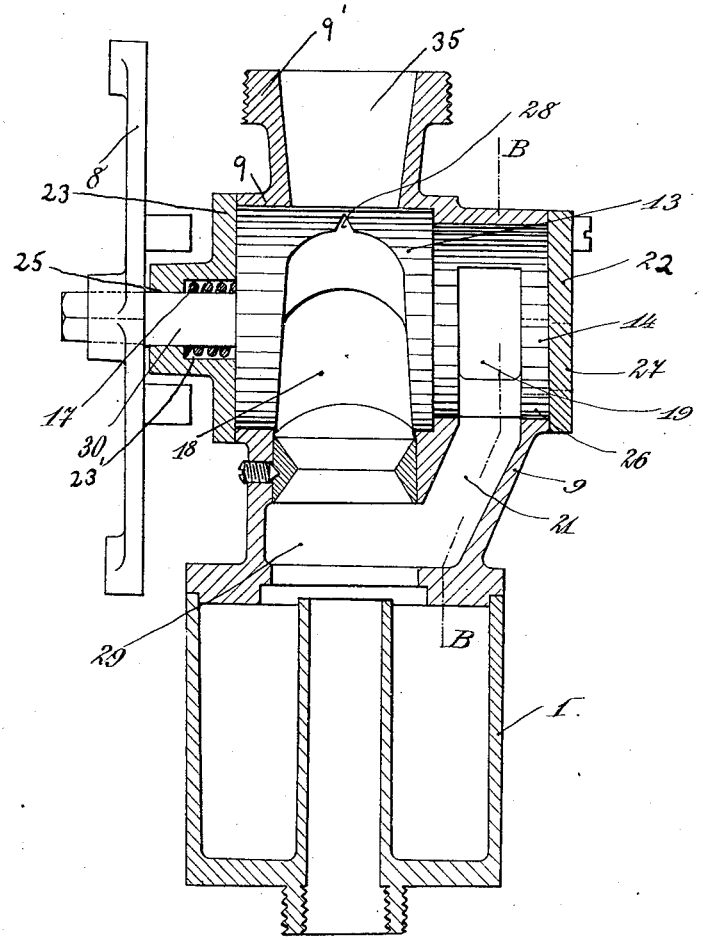
Figure 5:
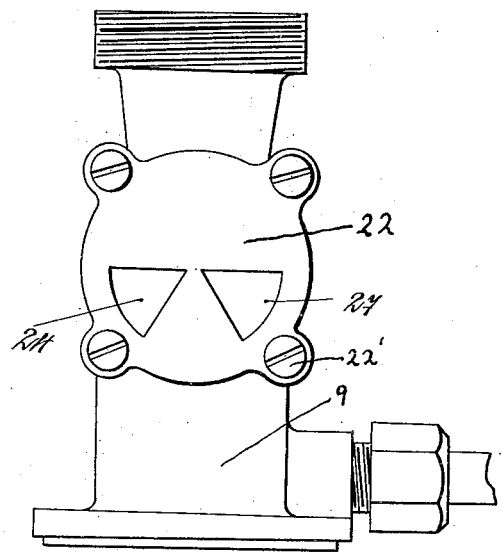
Figure 4:
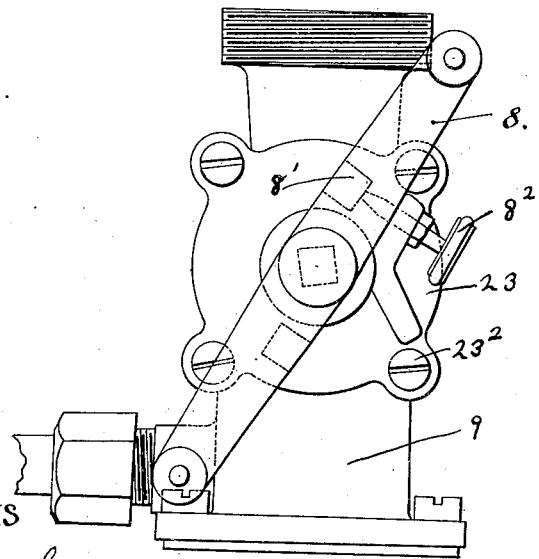

Figure 1 is a vertical section of the said carbureter; Fig. 2 is a section on the line A—A of Fig. 1; Fig. 3 is a section on the line B—B of Fig. 2; Fig. 4 is an end view as seen from one side; Fig. 5 is an end view as seen from the opposite side.

At the lower end of the apparatus is a tank 1 fed with fuel by means of a conduit 2 and containing a float 3 which, when in high position, presses the inlet valve 4 against its seat. In the cover 5 of the tank 1 extending therethrough is mounted a tube 11 the lower part of which extends into the tank and terminates near the bottom thereof while its upper part is curved in the horizontal direction and leads out above the tube, terminating in a spraying nozzle 10 extending over the open top of the tube 7. The tube 11 is open at its lower end 12 so as to admit the fuel. The tube 7 extends through the bottom of the tank 1 and forms what may be known as the initial air supply tube. The cover 5 of the tank 1 above mentioned forms the base or support of cylinder 9 of the rotary valve mechanism. This cylinder has two co-axial bores of different dimensions and has its ends closed by the plates 22 and 23. The plate 23 is supplied with an opening 25 having an enlarged portion 23'. The cylinder 9 has an upwardly extending portion 9' at the upper part thereof which forms channel 35 which is the outlet for the combustible mixture.

Above the tube 7 is arranged the rotary valve mechanism. Within the cylinder 9 a rotary valve is disposed, the shaft 30 of which extends through the opening 25 in the plate 23 and is solidly connected with a lever 8. This valve is formed by two cylindrical bearing surfaces 13 and 14 of different diameter to co-act with the diameters of the bores of the cylinder. The part 13 in the present instance having the larger diameter. Against the face of the part 13 or against the end of the valve the pressure of a spring 17 carried in the opening 23' is continually applied so as to hold the valve in closed working position against the plate 22.

The cylinder 9 forms between its base 5 and bores and beneath the part 13 of the valve proper, a chamber 29 in which the upper portion of the aforementioned initial air intake tube, and the spraying nozzle are situated. A conduit 21 communicates with this chamber. The part 13 of the valve presents a cutout portion 18 situated above the chamber 29. The solid portion of the part 13 is capable of shutting more or less of the air intake opening, leading to the engine. A notch 28 arranged in the said solid portion provides a small passage for the gas in the position of rest. The cylinder 14 has a cutout portion 19 situated above and communicating with the conduit 21. The cutout portion 19 communicates with longitudinal channels 26 arranged in the part 14, and these channels in turn are adapted to communicate with orifices 27 arranged in any suitable form in the plate 22 and serving as air inlets. The portion of the rotary valve cylinder 9 which surrounds the rotating part 14 shows also an orifice 24 adapted to communicate with the atmosphere and with passage 21 through the cutout portion 19. The plates 22 and 23 which close the cylinder ends may be secured to the cylinder by any suitable means such as screws 22' and 23².

The lever 8 is supplied on its under surface with stops 8' adapted to coact with adjusting screw 82 to assist in the regulation of the valve.

The operation of the device may be briefly described as follows: In the position represented in Figs. 1 and 2, which is a position of rest, the conduit 35 communicates with the chamber 29 by the narrow passage left at 20 by the notch 28 in such a manner as to allow of the starting and running of the engine at a low speed.

To increase the speed the valve is turned in the direction of the arrow of Fig. 1. The part 13 gradually opens the orifice of the suction tube 25 so as to allow the admission of a larger quantity of gas. At the same time the orifices 26 gradually come into communication with the orifices 27 and the cutout portion 19 connects with the orifice 24. Through these orifices a supply of additional air is brought about, and this air, being admitted around the spraying nozzle allows the running of the engine at high power under economic conditions.

What I claim and desire to secure by Letters Patent is:

In a carbureter having the usual float chamber and mixing chamber of an outlet for the combustible mixture, an atomizer, an initial air inlet opening into the mixing chamber and over which said atomizer opens, and means for supplying additional air to the combustible mixture comprising a cylinder disposed between said mixing chamber and combustible mixture outlet, a rotary valve within said cylinder, a transverse passage in said valve, an opening in the side wall of said cylinder with which said transverse passage is adapted to coact, openings in the end wall of said cylinder, longitudinal passages in said valve communicating at one end with the transverse passage and adapted to register with said end wall openings when the valve is opened as and for the purpose specified.

In testimony whereof I affix my signature in presence of two witnesses.

RAOUL LEDUC.

Witnesses:
 Louis Ferri,
 Ernest Feugiry.

Copies of this patent may be obtained for five cents each, by addressing the "Commissioner of Patents, Washington, D. C."